Figure 1:
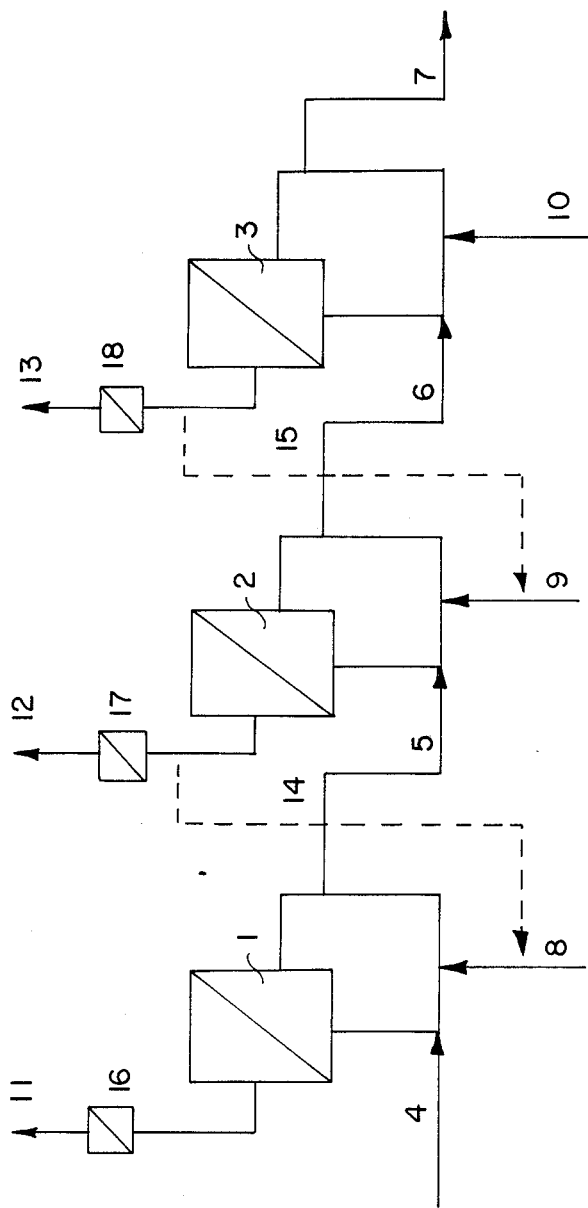

United States Patent [19]

Härtling et al.

[11] Patent Number: 4,865,744
[45] Date of Patent: Sep. 12, 1989

[54] PROCESS FOR THE CONTINUOUS WORKUP OF AQUEOUS CRUDE DYE SUSPENSIONS

[75] Inventors: Christiane Härtling, Schopfheim-Fahrnau, Fed. Rep. of Germany; Alberto Rabassa, Oberwil, Switzerland

[73] Assignee: Ciba-Geigy Corporation, Ardsley, N.Y.

[21] Appl. No.: 224,015

[22] Filed: Jul. 25, 1988

[30] Foreign Application Priority Data

Jul. 27, 1987 [CH] Switzerland ............ 2863/87

[51] Int. Cl.$^4$ .............. B01D 13/00; B01D 13/01
[52] U.S. Cl. ............................ 210/651; 210/654
[58] Field of Search ............ 210/634, 641, 644, 649, 210/650, 651, 652, 653, 654

[56] References Cited

U.S. PATENT DOCUMENTS

| | | | |
|---|---|---|---|
| 4,247,401 | 1/1981 | Block et al. | 210/638 |
| 4,477,634 | 10/1984 | Linder et al. | 525/327.1 |
| 4,523,924 | 6/1985 | Lacroix | 210/638 |
| 4,559,144 | 12/1985 | Pfenninger et al. | 210/638 |
| 4,560,480 | 12/1985 | Lacroix et al. | 210/638 |
| 4,584,103 | 4/1986 | Linder et al. | 210/650 |
| 4,604,204 | 8/1986 | Linder et al. | 210/490 |
| 4,689,048 | 8/1987 | Fortsch | 210/500.1 |
| 4,690,765 | 9/1987 | Linder et al. | 210/654 |
| 4,690,766 | 9/1987 | Linder et al. | 210/654 |
| 4,720,345 | 1/1988 | Linder et al. | 210/650 |

FOREIGN PATENT DOCUMENTS

| | | |
|---|---|---|
| 47953 | 8/1984 | European Pat. Off. |
| 82355 | 6/1986 | European Pat. Off. |

*Primary Examiner*—Frank Sever
*Attorney, Agent, or Firm*—Wenderoth, Lind & Ponack

[57] ABSTRACT

The continuous workup of aqueous crude dye suspensions is carried out in a multi-stage membrane separation unit by feeding into each membrane separation stage a dye suspension and also wash water, permeate from the subsequent membrane separation stage or a mixture consisting of wash water and permeate. A separation into retentate (concentrate) and permeate takes place, in which the degree of concentration and the degree of desalting in each membrane separation stage is controlled by means of a suitable variable, for example the conductivity or the volume of the permeate in each case or the concentration of the retentate. This control allows the reproducible preparation of dye formulations having constant properties and, due to the optimization of the volume streams, leads to a significant reduction in water pollution.

11 Claims, 1 Drawing Sheet

PROCESS FOR THE CONTINUOUS WORKUP OF AQUEOUS CRUDE DYE SUSPENSIONS

The present invention relates to a process for the continuous workup of aqueous crude dye suspensions in a multistage membrane separation unit. Workup is to be understood as meaning in particular the removal of inert materials, in particular of salts, from the dye suspensions and the concentration of these dye suspensions. The dye suspensions can be those of water-insoluble dyes or of dyes which are difficult to dissolve in water, but they can also be those of water-soluble dyes.

Organic dyes are present at the end of the synthesis, for example, in the form of dilute aqueous synthesis solutions or as synthesis suspensions of various concentrations, from which the dye is usually precipitated by the addition of salts and is then pressed off on filter presses. If appropriate the solutions or suspensions can also be further processed directly.

By adding water to the resulting press cakes dye suspensions or dye solutions for further processing can be prepared, which, however, (as a result of synthesis and processing) still contain undesirable amounts of salts and possibly organic by-products.

A high salt content and organic byproducts have a negative effect especially on the stability of liquid dye formulations insofar as they lead, for example, to precipitations. The organic by-products, which, in most cases, also have a colour of their own, can in addition cause an undesirable shift in the colour.

Necessary processing measures with the goal of preparing dye preparations ready for sale therefore relate in particular to the removal of by-products and salts (inert substances) and the concentration of the crude dye solutions or suspensions.

The use of filtration methods by means of membranes for working up these solutions or suspensions is generally known, but there are still significant problems with respect to a continuous operation of these workup processes. In particular, there is still a lack of suitable control of these processes, which, on the one hand, takes into account the varying compositions of the dye suspensions and, on the other hand, maintains the functioning of the membrane separation process in the multistage membrane separation unit, i.e. coordinates the required volume streams of the participating products with one another in such a way that an optimum degree of concentration and desalting (removal of inert substances in general) of the dye suspensions is achieved.

The object of the present invention is therefore to provide a process for the continuous workup of aqueous crude dye suspensions, which by means of a suitable control has improved efficiency, is flexible towards changes in the conditions of workup, which have to be adjusted, for example, to the changing concentrations and temperatures but also to changes in the pH of the dye suspensions, and which can therefore be used for many purposes.

It has now been found that the stated object can be achieved by the process for the workup of aqueous dye suspensions defined below and carried out continuously in a multistage membrane separation unit.

Accordingly, the present invention provides a process for the continuous workup of aqueous crude dye suspensions in a multistage membrane separation unit, wherein (a) in each membrane separation stage (n), in which n is a whole number greater than 1, in particular 2 to 5, a dye suspension ($F_n$) and wash water ($WW_n$), permeate ($P_{n+1}$) from the subsequent membrane separation stage (n+1) or mixtures of ($WW_n$) and ($P_{n+1}$) are introduced and separated into a dye suspension ($F_{n+1}$) *and a permeate* ($P_n$) and (b) the degree of concentration ($X_{Fn}$) and the degree of desalting ($X_{Bn}$) in each membrane separation stage are controlled via a suitable variable.

The present invention further provides the use of the process for dye suspensions of dyes which are difficult to dissolve or insoluble in water and also of water-soluble dyes, and the use of the resulting dye formulations for the preparation of concentrated liquid or solid dye preparations ready for sale, which can then be used for dyeing and printing various substrates, for example natural or synthetic, in particular textile, fibre materials, furthermore also paper or leather.

Dyes which are insoluble or difficult to dissolve in water can be pigments and especially disperse dyes and vat dyes. These dyes are known to a person skilled in the art. Reference is made to the corresponding listings in the Colour Index (C.I.) —pigments, disperse dyes, vat dyes.

These dyes belong to different classes; in the case of disperse dyes, they comprise, for example, nitro dyes, aminoketone dyes, ketonimine dyes, methine dyes, nitrodiphenylamino dyes, quinoline dyes, aminonaphthoquinone dyes, coumarin dyes and, in particular, anthraquinone dyes and azo dyes such as monoazo and disazo dyes.

The vat dyes used are, for example, indigoid dyes, anthraquinonoid dyes, for example indanthrene, and also sulfur dyes.

Water-soluble organic dyes are, for example, acid, direct and basic dyes, such as metal complex, chroming, developing and mordanting dyes and, in particular, reactives dyes. In particular, these are sulfo- and carboxylcontaining, metal-free or metallic and metallizable mono-, dis- and polyazo dyes, pyrazolone, thioxanthrone, oxazine, stilbene, formazan, anthraquinone, nitro, methine, triphenylmethane, xanthrone, naphthazarine, styryl, azastyryl, naphthoperinone, quinophthalone and phthalocyanine dyes and also dyes which have at least one fibre-reactive radical in the dye molecule.

The water soluble anionic dyes which are processed according to the present process primarily to dye formulations are in particular the alkali metal salts or ammonium salts of the so-called acid wool dyes, the reactive dyes or the substantive cotton dyes of the azo, anthraquinone and phthalocyanine series. Examples of azo dyes are metallic or metal-free mono- and disazo dyes and also formazan dyes which contain one or more sulfo groups.

The water-soluble basic dyes are the ordinary salts and metal halide, for example zinc chloride, double salts of the known cationic dyes, in particular of the methine or azamethine dyes containing, for example, an indolinium, pyrazolium, imidazolium, triazolium, tetrazolium, oxadiazolium, thiodiazolium, oxazolium, thiazolium, pyridinium, pyrimidinium or pyrazinium ring.

The heterocycles mentioned can be substituted or unsubstituted and/or fused with aromatic rings. Further examples are cationic dyes of the diphenylmethane, triphenylmethane, oxazine, thiazine and 1,2-pyran series and finally also dye salts of the arylazo and anthraquinone series.

According to the present invention, the term dyes shall also be understood as meaning fluorescent brighteners.

For example, brighteners which are insoluble or difficult to dissolve in water are those of the following compound classes: stilbenes, coumarins, benzocoumarins, pyrenes, pyrazines, pyrazolines, oxazines, mono- or dibenzoxolyl or -imdazolyl compounds, aryltriazole and v-triazole derivatives and also naphthalic imides.

The water-soluble brighteners are primarily stilbene brighteners, in particular those of the bis-triazinylaminostilbenedisulfonic acid, bis-styrylbiphenyl and bisstyrylbenzene and of the bis-triazolylstilbenedisulfonic acid type. The sulfo-containing brighteners are preferably present in the form of their metal salts, such as they are formed in the synthesis, for example lithium salts, potassium salts, magnesium salts or in particular sodium salts and also ammonium salts, amine salts or alkanolamine salts.

These dyes and fluorescent brighteners are known and are prepared by known continuously or batchwise operating synthetic processes; they are present at the end of the synthesis, depending on how the process is conducted and on their solubility properties, in the form of a synthesis solution or synthesis suspension.

The dye suspensions (aqueous crude dye suspensions) which are suitable for the process according to the invention can be prepared from dye synthesis solutions of water-soluble dyes, for example, by salting out the dyes from the synthesis solutions, filtering them off through press filters and suspending the dye press cakes only in such an amount of water that only dye suspensions but not solutions are formed. It is advantageous to pretreat (to standardize) these dye synthesis suspensions of the water-soluble dyes and also corresponding suspensions of the dyes which are difficult to dissolve or insoluble in water prior to the treatment according to the invention in the multistage membrane separation unit in such a way that they not only have a certain pH range (neutralization of strongly acid dye synthesis suspensions), a certain concentration of dye (filtration/-salting out method, possibly even a prior concentration by a membrane treatment) and a temperature in a certain temperature range, but also are present in a (physical) form (minimal colloidal proportion) suitable for the membrane separation process, which can be achieved, for example, by thermal conditioning of the dyes.

The dye (synthesis) suspensions used according to the invention usually have a dye content of 5 to 20% by weight and an inert substance (salt) content (mostly inorganic salts) from 1 to 30% by weight, in particular from 4 to 10% by weight. The pH of the suspensions can be in the range from 3 to 10, preferably 3 to 9, and their temperatures are in the range from 10° to 80° C., preferably in the range from 20° to 60° C.

The term aqueous crude dye suspensions, such as are worked up according to the invention, is to be understood as also meaning aqueous organic suspensions in addition to the purely aqueous suspensions.

For the process according to the invention for the continuous workup of the aqueous dye suspensions, the multistage membrane separation unit is usually operated according to the principle of ultrafiltration and/or cross-flow microfiltration.

Ultrafiltration is normally carried out using fine-pored membranes having pore diameters of from 1 to 1,000 nm, preferably 5 to 1,000 nm.

The ultrafiltration can be carried out not only under pressure but also by establishing a vacuum. Furthermore, the process can be operated under pressure on the dye solution side and, at the same time, by establishing a vacuum on the permeate side. In general, the process is carried out at a pressure of 0.5 to 10 bar or a vacuum of 200 to 20 mbar. Ultrafiltration by establishing a vacuum can be advantageous, since a vacuum on the permeated side counteracts blocking of the membrane and greatly increases the membrane flux, also in the case of low-boiling organic solvents the phenomenum of membrane fouling has to be taken into account.

Membranes for ultrafiltration can be not only those made of inorganic but also those made of organic material.

Inorganic membranes are, for example, those made of porous metal or metal alloys (so-called metal-sintered membranes, for example made of porous steel) or those made of porous carbon whose surface can be coated, for example, with a thin film consisting of zirconium oxide, silicon oxide or aluminium oxide or those made of porous glass or ceramics.

Organic materials for the preparation of membranes are, for example, organic polymers, in particular polyethylenes, polypropylenes, polytetrafluoroethylenes, cellulose acetates, polyacrylonitriles, polyvinyl alcohols, polystyrenes, polysulfones, polyimides or polyamides, which are unmodified or modified chemically or physically.

Preference is given to those membranes made of organic polymers which are modified by acid or basic groups in particular on the surface. The polymeric membrane material comprises natural, cellulosic or synthetic materials containing for example hydroxyl, amino and/or amidoxime groups as the reactive groups. Such materials can be reacted with suitable reactive compounds which, on the one hand, contain acid or basic groups and, on the other hand, at least one reactive grouping forming a chemical (covalent) bond.

The acid groups are primarily carboxyl and sulfo groups and the basic groups are primary, secondary or tertiary amino groups, furthermore phosphonium or sulfonium groups.

For example, the following membrane-forming polymers can be modified in the manner mentioned:
cellulose acetates, for example those having a low proportion of acetyl groups, but also more highly acylated cellulose, for example cellulose 2½-acetate, or polyvinyl alcohols,
polyacrylonitrile and copolymers made of acrylonitrile and other ethylenically unsaturated monomers,
polysulfones,
polystyrenes,
polyamides or
polyimides.

The reactive compounds containing an acid or basic group and suitable to be used for the chemical modification of the membrane-forming polymers or the membranes themselves can be not only colourless but also coloured compounds, in particular acid reactive dyes, which can belong to different classes, such as anthraquinone, azo and formazan dyes. They can also be present as metal complexes if appropriate.

Particularly suitable examples are ionically modified cellulose acetate, polyacrylonitrile, polystyrene, polyvinyl alcohol and in particular polysulfone membranes (U.S. Pat. No. 4,247,401, U.S. Pat. No. 4,605,204, U.S. Pat. No. 4,584,103, U.S. Pat. No. 4,477,634, U.S. Pat.

No. 4,690,765, U.S. Pat. No. 4,690,766, EP-A-47,953, EP-A-82,355).

The cross-flow microfiltration is usually carried out by using microporous membranes having pore diameters of 0.1 to 40 μm, preferably 0.2 to 10 μm.

The microfiltration is carried out at an operating pressure of 0.5 to 10 bar, preferably 0.5 to 5 bar.

Membranes for the microfiltration can be not only those made of organic but also those made of inorganic material. These are materials such as have also been mentioned for the preparation of ultrafiltration membranes.

The membranes are usually used in the form of membrane tubes, the tubes being assembled to form a tubular membrane module; depending on the type of the membrane separation unit, they can also be shaped in the form of plates, hoses or hollow fibres.

The individual stages of the membrane separation unit are connected in series. After the dye suspensions have passed through the entire membrane separation unit, they should have the desired high dye content and low salt content.

The degree of concentration and desalting can be identical or different from the stage to stage. It is also possible that one stage is designed for desalting only. In the latter case, the process is referred to as a continuous diafiltration in which the salt(inert material)-containing permeate is replaced by the corresponding amount of pure solvent (water or deionized water). This continuous wash process ensures that all components which can pass through the membrane are removed from the dye suspension by washing, the dye content of the suspension remaining virtually constant.

In what follows, the process according to the invention is illustrated in more detail by means of the description of preferred embodiments in combination with the drawing FIG. 1).

FIG. 1 shows a diagram of the stepwise sequence of the process according to the invention by means of a 3-stage membrane separation unit.

The reference numbers given in FIG. 1 designate the following parts:

1,2,3—membrane separation stages with closed cycle device, equipped with modules made of tubular membranes in which the dye suspension is separated into a permeate and a concentrate, 4,5,6—dye suspensions fed to the membrane separation stages 1, 2, 3 ($F_1$, $F_2$, $F_3$) (5 and 6 are the concentrates of stages 1 and 2), 7—dye suspension which leaves the multistage membrane separation unit (concentrate of 3rd stage) ($F_4$), 8, 9, 10—wash water feed to the membrane separation stages 1, 2 and 3 ($WW_1$, $WW_2$, $WW_3$)

11,12,13—permeate of membrane separation stages 1, 2 and 3 ($P_1$, $P_2$, $P_3$), 14, 15—recyclings of permeate from the 2nd and 3rd membrane stage into the 1st and 2nd membrane stage, 16,17,18—valve with flow meters for controlling and measuring a suitable variable, for example concentration (conductivity) of the permeate of membrane separation stages 1, 2 and 3 or the permeate volumes.

The dye suspension (4) and the wash waters (8, 9, 10) are fed via appropriate feed pumps which are controlled by flow meters (not shown in FIG. 1). No separate feed pumps are usually required for feeding the dye suspensions 5 and 6 into the membrane separation stages 2 and 3.

Furthermore, the membrane separation unit requires a further number of pumps (circulation pumps), valves (for example cycle vent valves, stage end valves, excess pressure relief valves) and also pressure gauges as well as stabilizing vessels (for preparing the dye suspensions), and, for example, further conventional storage vessels which are also not shown in FIG. 1.

All pumps, valves, flow meters and pressure gauges are connected to a process control computer.

Suitable variables for controlling the process according to the invention are, for example, the conductivity of the permeate, the volume of the dye concentrate ($F_{n+1}$) and in particular the permeate volume ($P_n$). Thus, it is possible, for example, to control the volume streams ($F_n$ and $WW_n$) by means of the permeate volume and set the degree of concentration and/or desalting for each membrane separation stage n.

This control takes place by means of the mathematical relationships $$X_{Fn} = \frac{C_{Fn+1}}{C_{Fn}} = \frac{F_n}{F_{n+1}}, \tag{1}$$

$$X_{Bn} = \frac{C_{Bn+1}}{C_{Bn}} = \frac{F_n}{F_n + WW_n} \text{ and} \tag{2}$$

$$P_n = F_n + WW_n - F_{n+1}, \tag{3}$$

in which $C_{Fn}$ and $C_{Fn+1}$ and $C_{Bn}$ and $C_{Bn+1}$ are the dye and salt concentrations of the dye suspensions ($F_n$) and $F_{n+1}$) which are fed into the nth membrane separation stage and leave this stage again, $P_n$ is the volume of the permeate of the nth membrane separation stage and $WW_n$ is the volume of the wash water which is fed into the nth membrane separation stage, and $X_{Fn}$ and $X_{Bn}$ are the degree of concentration and desalting (concentration and desalting factors) in each membrane separation stage. The degree of concentration ($X_{Ftotal}$) and the degree of desalting ($X_{Btotal}$) of the entire membrane separation unit is given by the product of the individual $X_{Fn}$ and $X_{Bn}$ values :

$$X_{Ftotal} = X_{F1} \cdot X_{F2} \cdot \ldots K_{Fn} \tag{4}$$

$$X_{Ftotal} = X_{B1} \cdot X_{B2} \cdot \ldots X_{Bn} \tag{5}$$

In equation (1), the dye concentration factor ($X_{Fn}$) is expressed in relation to the dye suspension streams (concentrates) $F_n / F_{n+1}$ (concentrate control). Substituting $F_{n+1}$ by the definition given in equation (3) gives $$X_{Fn} = \frac{F_n}{F_n + WW_n - P_n} \tag{6}$$

and hence a relationship for the control via the permeate (volume) ($P_n$—permeate control).

Substituting $F_n + WW_n$ in equation (2) by the corresponding expression from equation (3) gives $$X_{Bn} = \frac{F_n}{P_n + F_{n+1}}, \tag{7}$$

which, in addition to control via the concentration of the dye suspension streams (concentrates) $F_n / F_{n+1}$, also allows such a control via the permeate volume ($P_n$—permeate control).

Equations (1) to (5) are known per se in the technology of membrane separation processes. Their use for controlling volume streams—via volumes per se or via concentrations (for example conductivity)—in multistage, continuously operating membrane separation units and thus the control of desalting and concentration of these volume streams is, however, novel and forms part of the process of the present invention.

It is possible to set $P_n$—under the assumption that $F_n$ and $WW_n$ are constant—to a large value (large permeate volume) according to equation (3), if $F_{n+1}$ (concentrate leaving the membrane separation stage and fed into the membrane separation stage $n+1$) is as small as possible, that is, if concentration and desalting takes place. In contrast, a small value for $P_n$ means that a large amount $F_{n+1}$ is possible, that is, a desalting (removal of salt by washing) at constant volume streams or optionally in combination with a dilution of $F_{n+1}$ takes place.

On the one hand, the permeate volume $P_n$ can be set for each membrane separation stage to a value, then remains constant during the treatment of the dye suspension in this membrane separation stage, thus controls the amount (volume) of the concentrate leaving the membrane separation stage n and hence determines whether in the membrane separation stage mentioned a desalting, possibly in combination with dilution (diafiltration) or a concentration and desalting takes place.

On the other hand, the permeate volume $P_n$ as a variable can, however, also be varied during the individual operation in a membrane separation stage, for example during the initial phase, and in the case where the volume $F_n$ and its concentration of dye and inert substance are not constant (irregular feed of the dye suspension, for example depending on the synthesis).

A portion or the entire amount of permeate ($P_{n+1}$) of the membrane separation stage $n+1$ can be recycled, that is, it can be recycled into the previous membrane separation stage n where it is, optionally in combination with added wash water $WW_1$, used for diafiltration. The salt (inert substance) content of these recycled permeates should be as low as possible.

This permeate circulation allows the amount of waste water (waste water = sum of the volumes of all permeates) to be kept to a minimum.

In the case where dilute crude dye suspensions which, however, have a relatively high salt content are fed into the membrane separation unit, a permeate recycling is not suitable (permeate has a high salt content).

However, in the case of relatively concentrated crude dye suspensions already having a high dye content, the permeate recycling is a suitable measure for reducing the amounts of wash water and permeate. It is also possible to add, for example, a reverse osmosis process for further (complete) desalting.

The process according to the invention makes it possible to prepare concentrated and largely desalted dye suspensions having constant properties and good reproducibility. This fact facilitates very significantly the further processing to give dye preparations ready for marketing and use. which can be obtained in a conventional manner.

Additives customary for the preparation of dye preparations ready for marketing and use are, for example, antifoams, antifreezes, humectants, dispersants and/or microbicides. After that, they can be brought to a predetermined final dye content only by diluting with water and/or by means of diluents. However, the dye dispersion can also be converted, possibly after the addition of additives, such as binders, dedusting agents, wetting agents, dispersants and/or diluents, to a solid dye product by removal of water. Due to the increased dye concentration less energy is required for drying. Conventional drying processes are used, in particular spray-drying.

The dye preparations are used for preparing dyebaths, padding liquors or print pastes for a large variety of substrates, in particular for textile fibre materials, paper or leather.

The examples which follow serve to illustrate the invention without limiting it thereto. Parts and percentages are by weight.

EXAMPLE 1

An aqueous dye dispersion of C.I. Disperse Orange 149 is treated for 30 minutes at 98° C. with stirring (thermally stabilized). The dye and inert substance (salt) concentration is $C_{F1}=12.6\%$ by weight and $C_{B1}=6.0\%$ by weight. This dye suspension is concentrated and desalted in a 3-stage membrane separation unit (ultrafiltration unit). After the process is finished, the dye suspension should have a dye content $C_{F4}$ of about 18.0% by weight and an inert substance (salt) content $C_{B4}$ of about 0.8% by weight. The dispersion has a temperature of 35° C. The pressure in the cycles of each membrane separation stage is about 1.5 bar.

The process is carried out according to the flow diagram of FIG. 1. The membrane separation stages (1, 2, 3) with closed cycle are equipped with modules mounted with membranes made of zirconium oxide with carbon as the carrier material; the membrane area is 0.055 m² per membrane separation stage. Each of the cycle volumes is 360 ml.

After passing through an initial phase, the steady state necessary for carrying out the process is reached at that point at which the water in the membrane separation stages 1 to 3 is replaced by dye suspension of the concentrations $C_{F2}$ to $C_{F4}$. The volume streams of the dye suspension and of the wash water are adapted to the size of the membrane separation unit.

To obtain the desired final specification of the dye suspension, the process is controlled in the individual membrane separation stages as follows:

Stage 1: in stage 1, 50 ml/min. each of dye suspension ($F_1$) and wash water ($WW_1$) are fed in via a metering pumps. The amount of permeate of stage 1 ($P_1$) is set to 50 ml/min. (16). This produces a dye suspension stream $F_2$ leaving stage 1 of likewise 50 ml/min. and a dye content $C_{F2}$ of 12.6% by weight and an inert substance (salt) content $C_{B4}=3.0\%$ by weight.

Stage 2: in stage 2, 40 ml/min. of wash water ($WW_2$) are fed into the dye suspension stream $F_2$ via a metering pump. The amount of permeate ($P_2$) is set to 50 ml/min. (17). This produces a dye suspension stream $F_3$ leaving stage 2 of 40 ml/min. and a dye content $C_{F3}$ of 15.75% by weight and an inert substance content $C_{B3}$ of 1.7% by weight.

Stage 3: in stage 3, 45 ml/min. of wash water ($WW_3$) are fed into the dye suspension stream $F_3$ via a metering pump. The amount of permeate ($P_3$) is set to 50 ml/min. (18). A dye suspension stream $F_4$ of 35 ml/min. having the following final specifications leaves stage 3: dye content $C_{F4}=18\%$ by weight and inert substance content $C_{B4}=0.8\%$ by weight.

EXAMPLE 2

An aqueous dye suspension of C.I. Acid Yellow 118 having a dye content $C_{F1}$ of 12.2% by weight and an inert substance content $C_{B1}$ of 12.3% by weight is concentrated in a 2-stage membrane separation unit (ultrafiltration unit) and desalted with permeate recirculation. Before this workup, the dye is chromated and before that, the unchromed dye can if appropriate have been concentrated in an ultrafiltration stage. The chromed dye suspension should have a dye content $C_{F3}$ of 20% by weight and an inert substance content $C_{B3}$ of 0.8% by weight after the process is finished. The dispersion has a temperature of about 70° C. in all stages. The pressure in the cycles is 4 to 5 bar.

The process is carried out in stages 1 and 2 (or 2 and 3) according to the flow diagram of FIG. 1. The two membrane separation stages with closed cycle are equipped with modules mounted with membranes made of zirconium oxide with carbon as carrier material; the membrane area is 22 m² per stage at a cycle volume of 150 l.

After passing through an initial phase, the steady state necessary for carrying out the process is reached at that point at which the water in membrane separation stages 1 and 2 has been replaced by dye suspension of the concentrations $C_{F2}$ and $C_{F3}$ and stage 2 supplies enough permeate as wash water for stage 1. The dimensions of the unit are adapted to the dye volume stream predetermined by the synthesis.

To obtain the desired final specification of the dye suspension, the process in the individual membrane separation stages is controlled as follows:

Stage 1: in stage 1, 1,000 l/h of dye suspension ($F_1$) and 3,300 l/h of permeate of stage 2 ($P_2$) having an inert substance (salt) content of 0.7% by weight are fed in as wash water ($WW_1$). The amount of permeate of stage 1 ($P_1$) is set to 3,500 l/h. This produces a dye suspension stream $F_2$ leaving stage 1 of 800 l/h having a dye content $C_{F2}$ of 15.25% by weight and an inert substance content $C_{B2}$ of 3.4% by weight.

Stage 2: in stage 2, 3,100 l/h of wash water are fed into the dye suspension stream $F_2$. At an amount of permeate ($P_2$) set to 3,300 l/h, a dye suspension stream $F_3$ of 600 l/h having the following final specifications leaves stage 2: dye content $C_{F3}=20\%$ by weight and inert substance content $C_{B3}=0.7\%$ by weight.

Without permeate recirculation a total of 6,100 l/h of chromium-containing waste water would be formed in the two stages during the desalting. In this example, permeate recirculation results in a 43% reduction of the waste water volume.

EXAMPLE 3

An aqueous acid dye dispersion of C.I. Disperse Blue 125 having a dye content $C_{F1}$ of 1.9% by weight and an inert substance content $C_{B1}$ of 4.25% by weight is concentrated in a membrane separation stage (ultrafiltration), the concentrate is continuously neutralized in a stabilizing vessel and treated at 95° C. (thermally stabilized), the residence time being about 30 minutes.

This dye suspension is then further concentrated in a 2-stage membrane separation unit (ultrafiltration) and desalted. After the process is finished, the dye suspension should have a dye content $C_{F4}$ of about 19% by weight and an inert substance (salt) content $C_{B4}$ of about 0.8% by weight.

Before the stabilization, the suspension has a temperature of 15° to 20° C. and, after the stabilization, a temperature of 50° to 60° C. in the stages. The pressure in the cycles is 4 to 5 bar.

The process is carried out according to the flow diagram of FIG. 1, the concentrate stream 5 passing through a stabilizing vessel. The membrane separation stages (1, 2, 3) with closed cycle are equipped with modules mounted with membranes made of zirconium oxide with carbon as the carrier material; the membrane area is 22 m² per stage at a cycle volume of about 150 l.

After passing through the initial phase, the steady state necessary for carrying out the process is reached at that point at which the water in the membrane separation stages 1 to 3 has been replaced by dye suspension of the concentrations $C_{F2}$ to $C_{F4}$. The volume stream $F_1$ of the dye suspension is predetermined by the output of a continuous dye synthesis unit.

To obtain the desired final specification of the dye suspension, the process is controlled in the individual membrane separation stages as follows:

Stage 1: in stage 1, 5,250 l/h of dye suspension ($F_1$) are pumped in. The amount of permeate of stage 1 ($P_1$) is set to 4,000 l/h. This produces a dye suspension stream $F_2$ leaving stage 1 to 1,250 l/h having a dye content $C_{F2}$ of 8% by weight and an unchanged inert substance content in the liquid phase $C_{B2}$ of 4.25% by weight.

Stage 2: a suspension stream $F_{2a}$ of 1,400 l/h having a dye content $C_{F2a}$ of about 7.2% by weight and an inert substance content $C_{B2a}$ of about 3.8% by weight (increase in volume by stabilization with direct vapour) is pumped from the stabilizing vessel into stage 2. The addition of wash water ($WW_2$) in stage 2 is 1,200 l/h. The amount of permeate ($P_2$) is set to 1,800 l/h. This produces a dye suspension stream $F_3$ leaving stage 2 of 800 l/h having a dye content $C_{F3}$ of 12.5% by weight and an inert substance content $C_{B3}$ of 2% by weight.

Stage 3: in stage 3, 1,700 l/h of wash water ($WW_3$) are fed into the dye suspension stream $F_3$. At an amount of permeate ($P_3$) set to 2,000 l/h, a dye suspension stream $F_4$ of 500 l/h having the following final specifications leaves stage 3: dye content $C_{F4}=20\%$ by weight and inert substance content $C_{B4}=0.65\%$ by weight.

This distribution of the amounts of wash water and permeate over the ultrafiltration stages 2 and 3 produces the smallest amount of waste water for the fixed dye concentration factor $X_{F2}$ in stage 2.

EXAMPLE 4

An aqueous acid dye dispersion of C.I. Disperse Brown 1 having a dye content $C_{F1}$ of 3.2% by weight and an inert substance content $C_{B1}$ of 3.8% by weight is concentrated and desalted in a membrane separation stage (ultrafiltration), the concentrate is continuously treated in a stabilizing vessel at 95° C. (thermally stabilized), the residence time being about 30 minutes.

This acid dye suspension is then further concentrated in a 2-stage membrane separation unit (ultrafiltration) and desalted. After the process is finished, the dye suspension should have a dye content $C_{F4}$ of about 18% by weight and an inert substance content of about 0.3% by weight.

Before the stabilization, the suspension has a temperature of 15° to 20° C. and, after the stabilization, a temperature of 50° to 60° C. in the stages. The pressure in the cycles is 4 to 5 bar.

The process is carried out according to the flow diagram of FIG. 1, the concentrate stream 5 passing through a stabilizing vessel. The membrane separation stages (1, 2, 3) with closed cycle are equipped with modules mounted with membranes made of zirconium oxide with carbon as the carrier material; the membrane area is 22 m² per stage at a cycle volume of about 150 l.

After passing through the initial phase, the steady state necessary for carrying out the process is reached at the point at which the water in the membrane separation stages 1 to 3 has been replaced by dye suspension of the concentrations $C_{F2}$ to $C_{F4}$. The volume stream $F_1$ of the dye suspension is predetermined by the output of a continuous dye synthesis unit.

To obtain the desired final specification of the dye suspension, the process is controlled in the individual membrane separation stages as follows:

Stage 1: in stage 1, 3,300 l/h of dye suspension ($F_1$) and 1,500 l/h of wash water ($WW_1$) are pumped in. The amount of permeate of stage 1 ($P_1$) is set to 3,500 l/h. This produces a dye suspension stream $F_2$ leaving stage 2 of 1,300 l/h having a dye content $C_{F2}$ of 8% by weight and an inert substance (salt) content in the liquid phase of 2.6% by weight.

Stage 2: a suspension stream $F_{2a}$ of 1,450 l/h having a dye content $C_{F2a}$ of about 7.3% by weight (increase in volume by stabilization with direct vapour) is pumped from the stabilizing vessel into stage 2.

The addition of wash water ($WW_2$) in stage 2 is 3,000 l/h. The amount of permeate ($P_2$) is set to 3,450 l/h.

This produces a dye suspension stream $F_3$ leaving stage 2 of 1,000 l/h having a dye content $C_{F3}$ of 10.5% by weight and an inert substance content $C_{B3}$ of 0.8% by weight.

Stage 3: In stage 3, 3,000 l/h of wash water ($WW_3$) are fed into the dye suspension stream $F_3$. At an amount of permeate ($P_3$) set to 3,450 l/h, a dye suspension stream $F_4$ of 550 l/h having the following final specifications leaves stage 3; dye content $C_{F4}=19\%$ by weight and inert substance content $C_{B4}=0.2\%$ by weight.

The still acid suspension largely freed from the inert substance content is subsequently neutralized with aqueous sodium hydroxide solution.

By distributing the amount of wash water and permeate over the ultrafiltration stages 1, 2 and 3, the capacity of the stages is fully utilized for achieving a maximum desalting effect in the case of fixed dye concentration factors $X_{F1}$, $X_{F2}$ and $X_{F3}$.

What is claimed is:

1. A process for continuous workup of an aqueous crude dye suspension in a multistage membrane separation plant, which comprises
    (a) introducing in each membrane separation stage (n), in which n is a whole number greater than 1, a dye suspension ($F_n$) and wash water ($WW_n$), permeate ($P_{n+1}$) from the subsequent membrane separation stage (n+1) or mixtures of ($WW_n$) and ($P_{n+1}$), and separating them into a dye suspension ($F_{n+1}$) and a permeate ($P_n$), and
    (b) controlling the degree of concentration ($X_{Fn}$) and the degree of desalting ($X_{Bn}$) in each membrane separation stage by the volume of permeate ($P_n$) or the volume of dye suspension ($F_{n+1}$) according to the following relationships:

$$X_{Fn} = \frac{C_{Fn+1}}{C_{Fn}} = \frac{F_n}{F_{n+1}}$$

$$X_{Bn} = \frac{C_{Bn+1}}{C_{Bn}} = \frac{F_n}{F_n + WW_n}$$

$$P_n = F_n + WW_n - F_{n+1},$$

in which $C_{Fn}$ and $C_{Fn+1}$ and $C_{Bn}$ and $C_{Bn+1}$ are the dye and salt concentrations of the dye suspensions ($F_n$) and ($F_{n+1}$) which are fed into the n-th membrane separation stage and leave this stage again, $P_n$ and $WW_n$ are as defined above, and the degree of concentration ($X_{Ftotal}$) and the degree of desalting ($X_{Btotal}$) of the entire membrane separation unit is given by the product of the individual $X_{Fn}$—and $X_{Bn}$—values.

2. A process according to claim 1, wherein the crude dye suspension ($F_n$) is a suspension as directly obtained after the synthesis of the dye or is a suspension which has previously been stabilized and standardized.

3. A process according to claim 1, wherein the crude dye suspensions are desalted in the individual stages of the membrane separation unit or are desalted and concentrated, and the process is conducted in the membrane separation stages identically or differently from one another.

4. A process according to claim 3, wherein the crude dye suspension is desalted in the first stage of the membrane separation unit and is desalted and concentrated in the further stages.

5. A process according to claim 3, wherein the crude dye suspension is desalted and concentrated in the first stage of the membrane separation unit and is desalted in the further stages.

6. A process according to claim 1, wherein the membrane separation stage (n) is fed with the dye suspension ($F_n$) and a mixture consisting of the wash water ($WW_n$) and the permeate ($P_{n+1}$) of the subsequent membrane separation stage (n+1).

7. A process according to claim 1, wherein the membrane separation unit is operated according to the principle of ultrafiltration and/or cross-flow microfiltration.

8. A process according to claim 1, wherein the control of the workup of the crude dye suspensions is carried out by means of a process control computer.

9. A process according to claim 1, wherein dye suspensions of dyes which are difficult to dissolve or insoluble in water or of water-soluble dyes are worked-up.

10. A dye formulation obtained by the process according to claim 1.

11. A process according to claim 10, wherein n is a whole number of 2 to 5.

* * * * *